F. L. BEYMER.
CLASP.
APPLICATION FILED JAN. 4, 1908.
906,502.
Patented Dec. 15, 1908.
2 SHEETS—SHEET 1.
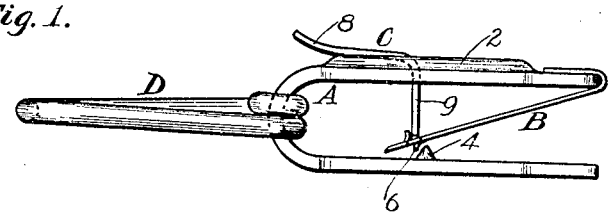
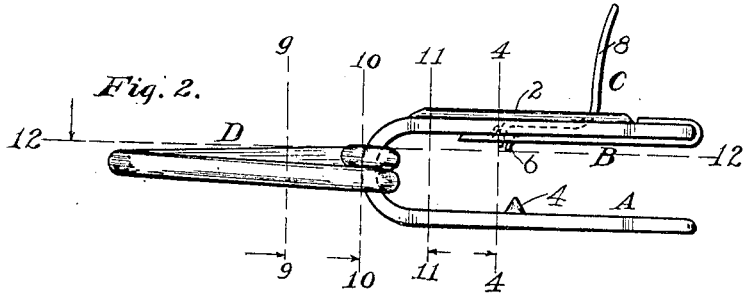
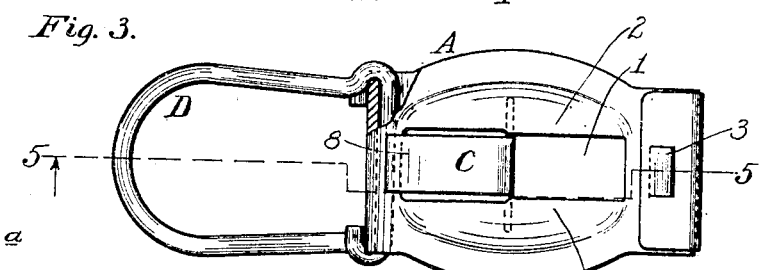
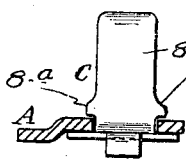
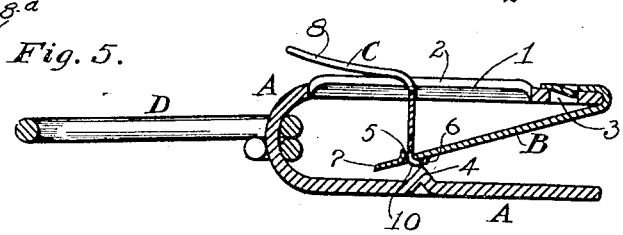
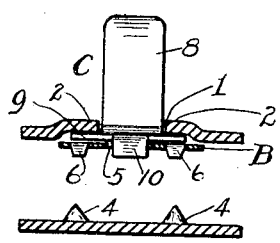
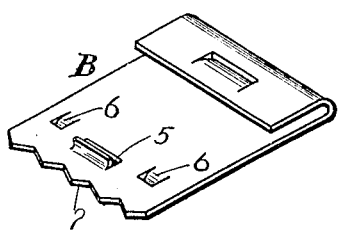
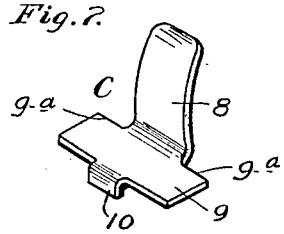
Witnesses,
William Whaley
Carrie R. Ivy
Inventor,
Frederick L. Beymer
By Cyrus Kehr
Attorney.

F. L. BEYMER.
CLASP.
APPLICATION FILED JAN. 4, 1908.
906,502.
Patented Dec. 15, 1908.
2 SHEETS—SHEET 2.
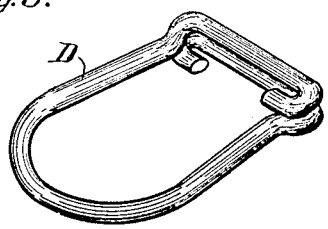
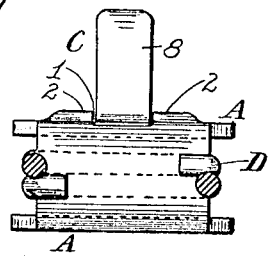
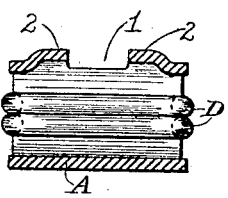
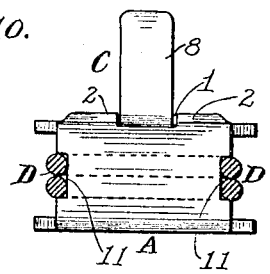
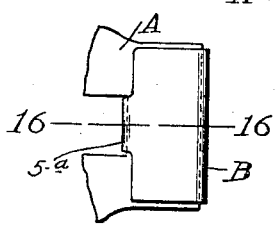
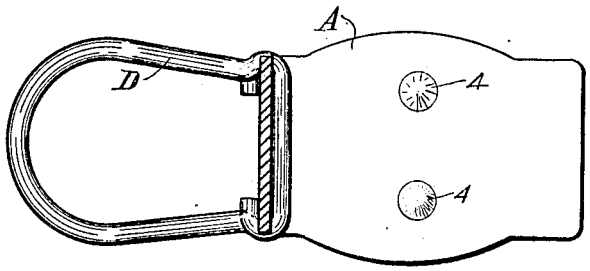
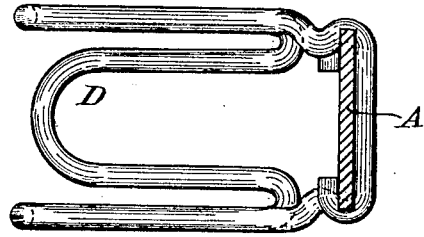
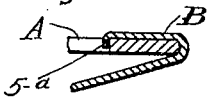
Witnesses,
William Whaley.
Carrie R. Ivy
Inventor,
Frederick L. Beymer
By Cyrus Kehr
Attorney

UNITED STATES PATENT OFFICE.

FREDERICK L. BEYMER, OF CHICAGO, ILLINOIS.

CLASP.

No. 906,502.

Specification of Letters Patent.

Patented Dec. 15, 1908.

Application filed January 4, 1908. Serial No. 409,295.

*To all whom it may concern:*

Be it known that I, FREDERICK L. BEYMER, a citizen of the United States, residing at Chicago, in the county of Cook and State of Illinois, have invented a new and useful Improvement in Clasps, of which the following is a specification, reference being had to the accompanying drawing.

My invention relates particularly to metallic clasps for engaging folds or edges of sheet-form material, for example garments, the clasp being well adapted to be used as or made a part of a garment supporter.

The object of the invention is to produce such a clasp of efficient and durable form and of a form adapted to simple and economical manufacture.

In the accompanying drawings, Figure 1 is a side elevation of a clasp embodying my improvement, the clasp being closed; Fig. 2 is a similar elevation, the clasp being open; Fig. 3 is a plan of the same clasp; Fig. 4 is a section on the line 4—4 of Fig. 2, looking in the direction of the arrow; Fig. 4$^a$ shows another form of the structure shown in Fig. 4; Fig. 5 is a section on the line 5—5 of Fig. 3, looking in the direction of the arrow; Fig. 6 is a perspective of the tongue; Fig. 7 is a perspective of the tongue-operating lever; Fig. 8 is a perspective of a wire extension applied to the clasp body for securing the clasp to chains, garments, and the like; Fig. 9 is a section on the line 9—9 of Fig. 2, looking in the direction of the arrow; Fig. 10 is a section on the line 10—10 of Fig. 2, looking in the direction of the arrow; Fig. 11 is a section on the line 11—11 of Fig. 2, looking in the direction of the arrow; Fig. 12 is a section on the line 12—12 of Fig. 2, looking in the direction of the arrow; Figs. 13 and 14 illustrate the wire extension in the form of a hook; Figs. 15 and 16 show another form of tongue attachment.

Referring to said drawings, A is the body of the clasp. This is formed by bending a strip of sheet metal into U-shape with sufficient interior space to make room for the clamping tongue or member and a portion of the lever used for controlling the tongue member.

For convenience in description, the open end of the body is herein called the front end while the opposite or closed end is called the rear end.

In the upper portion or arm of the body, A, is a longitudinal slot, 1, which is preferably slightly wider at its rear end than at its front end and which has along each side a raised lip, 2. Between said slot and the front end of said body is an aperture, 3. In the lower portion or arm of the body, A, the metal is pressed upward to form teeth, 4, in proper position to coöperate with teeth on the clamping tongue, to be next described, for the engagement of any article to which the clasp is to be applied.

The clamping tongue, B, is formed of relatively thin spring sheet metal folded upon itself so as to embrace the front end of the upper arm of the body, A, and extend rearward through the space within said body. The upper portion of said tongue is pressed downward into the said aperture, 3, in the upper arm of the body, A. In Figs. 15 and 16, the aperture, 3, is omitted and an extension, 5$^a$, of the tongue is pressed into the slot, 1. In the rear portion of said tongue is an aperture, 5, and at each side of said aperture the metal is pressed downward to form teeth, 6, which are adapted to act in opposition to the teeth, 4, when the tongue is pressed downward. And the rear edge or end of the tongue has rearward-directed teeth, 7, adapted to engage the fabric to which the clasp is to be applied.

C is a lever by means of which the tongue, B, is pressed down. Said lever has a handle, 8, which extends through the slot, 1, of the body, A. From said handle a head, 9, extends downward approximately at right angles to the handle and is wide enough to form shoulders, 9$^a$, extending beneath the lips, 2, at each side of the slot, 1, the adjacent end of the handle being as wide as the slot in order that the lever may be guided for lengthwise movement in said slot. In Fig. 4$^a$, the lever has shoulders, 8$^a$, above each lip, 2, to aid in guiding for such lengthwise movement.

From the head, 9, a finger, 10, extends downward through the aperture, 5, of the tongue, the tongue bearing upward against the head, 9, at each side of the finger, 10. The lower end of said finger is preferably bent forward, as shown in the drawings, in order that the finger may be the better retained in the slot, 5.

It will be observed that the points of engagement between the three members, the body, A, tongue, B, and lever, C, are four in number: (1) The spring is engaged upon the front end of the upper arm of the body, A, by being folded around said end and a part thereof being pressed into the aperture, 3, or into the front end of the slot, 1. (2) The lever, C, forms a hinge engagement with the free end of the tongue in the aperture, 5. (3) The lever, C, forms a sliding engagement with the lips, 2, of the upper portion of the body, A. (4) The free end of the tongue, when depressed by the lever, C, bears downward upon the material placed between said tongue and the lower arm of the body and through said material engages said lower arm.

When the clasp is open, the head, 9, of the lever lies flatwise between the tongue and the upper arm of the body, A, and adjacent the free or front end of said arm. The space beneath the raised lips, 2, makes room for said head in approximately the plane of said arm, so that the spring may rest more closely against the lower face of said arm. When the tongue is to be depressed, the handle, 8, is moved rearward, the base of said handle sliding in the slot, 1, and the shoulders, $9^a$ of the head, 9, sliding along the lower faces of said lips, and the shoulders, $8^a$, (if present) sliding along the upper faces of said lips, and the lever, C, as a whole, turning on the hinge formed between it and the tongue in the slot, 5, of the tongue.

It will be observed that when the tongue, B, is depressed, it extends obliquely rearward and downward, so that forward strain on fabric beneath the tongue tends to bind the fabric more because pulling on the lower portion of the tongue tends to force the tongue downward. It will also be observed that the three members of the clasp thus far described can be formed and assembled by merely stamping and pressing and without riveting or soldering or other more difficult operations.

The extension or loop, D, is composed of a single wire extending around the body, A, at the curved rear portion of the latter. The ends of the wire extend around said curved portion of the body, A, from opposite sides and are curved around the edge of said body. Thus said wire crosses each edge of the body, A, twice and the ends of the wire overlap each other. At each such crossing, the wire is closely pressed against and around said edge and preferably into recesses, 11, 11, in said edges, whereby said extension or loop is made rigid upon the body, A, without soldering. And the two-fold bearing of said loop (by the two overlapping ends of the wire) gives said loop two lines (virtually a base instead of a single line) for engagement with said body.

In Figs. 13 and 14, the extension or loop is made longer and folded upon itself to form a hook whereby the clasp may be hung to a band or other horizontal part of a garment.

I claim as my invention:

1. In a device of the nature described, the combination of a U-shape body, a tongue secured to one of the arms of said body, and a lever hinged to said tongue and having a pivotal bearing portion slidable on said body.

2. In a device of the nature described, the combination of a slotted U-shape body, a spring tongue, and a lever hinged to said tongue and slidable in the slot of the body.

3. In a device of the nature described, the combination of a U-shape body, a tongue secured upon one of the arms of said body, and a lever slidable upon said arm for operating said tongue.

4. In a device of the nature described, the combination of a U-shape body, a tongue secured upon one of the arms of said body, and a lever hinged to said tongue and slidable on said arm.

5. In a device of the nature described, the combination of a U-shape body having an opening in one of its arms, a tongue folded upon said arm and pressed into said opening, and a lever in engagement with said body and said tongue.

6. In a device of the nature described, the combination of a U-shape body having an opening in one of its arms, a tongue folded upon said arm and secured into said opening, and a lever hinged to said tongue and slidable on said body.

7. In a device of the nature described, the combination of a U-shape body, a tongue, a lever for operating said tongue, and an extension formed of wire having its ends overlapping each other and pressed upon said body.

8. In a device of the nature described, the combination of a U-shape body, a tongue, a lever for operating said tongue, and an extension formed of wire having its ends pressed into recesses in the edges of said body.

9. In a device of the nature described, the combination of a U-shape body, a tongue, a lever for operating said tongue, and an extension formed of wire having its ends overlapping and pressed into recesses in the edges of said body.

10. In a device of the nature described, the combination of a U-shape body, a tongue, and a lever hinged to said tongue and slidable on said body and having shoulders above the upper face of said body.

In testimony whereof I have signed my name, in presence of two witnesses, this 24th day of December, in the year one thousand nine hundred and seven.

FREDERICK L. BEYMER.

Witnesses:
A. D. W. GILL,
W. H. GOSS.